United States Patent [19]

Feuerstein et al.

[11] Patent Number: 5,978,457
[45] Date of Patent: Nov. 2, 1999

[54] ALARM COMMUNICATION METHOD AND DEVICE

[75] Inventors: Israel Feuerstein, Ramat Gan; Alfred Geiger, Tel Aviv, both of Israel

[73] Assignee: D.E.S.K. Ltd., Israel

[21] Appl. No.: 08/925,290

[22] Filed: Sep. 8, 1997

[30] Foreign Application Priority Data

Sep. 8, 1996 [IL] Israel ........................................ 119220

[51] Int. Cl.⁶ ............................ H04M 1/56; H04M 11/04
[52] U.S. Cl. ................................ 379/142; 379/39; 379/51
[58] Field of Search ............................. 379/142, 38, 39, 379/34, 33, 45, 46, 51, 49

[56] References Cited

U.S. PATENT DOCUMENTS 5,170,426  12/1992  D'Alessio et al. ........................ 379/38
5,195,126   3/1993  Carrier et al. ............................ 379/45
5,278,539   1/1994  Lauterbach et al. ...................... 379/40

Primary Examiner—Paul Loomis
Attorney, Agent, or Firm—Londa and Traub LLP

[57] ABSTRACT

An alarm communication device and a method for mutual recognition between a first alarm unit and a second unit connected therebetween by a public switching unit is provided. The first alarm unit is connected to the public switching unit via at least one first communication line and the second unit is connected to the public switching unit via at least one second communication line. The method includes the steps of detecting a ring signal at the first alarm unit, detecting a caller identification (ID) signal provided by the public switching unit, determining a caller ID number from the caller ID signal, matching the caller ID number with at least one predetermined number and when the caller ID number is matched to one of the at least one predetermined number associated with the second unit, executing a predetermined procedure associated with the matched at least one predetermined number.

5 Claims, 8 Drawing Sheets

ALARM COMMUNICATION METHOD AND DEVICE

FIELD OF THE INVENTION

The present invention relates to remote alarm systems.

BACKGROUND OF THE INVENTION

Remote alarm systems are known in the art. These systems consist of a monitoring center and a plurality of remote units which are located in various locations. The remote units are generally connected to the monitoring center via a telephone network.

Telephone based alarm systems for monitoring guarded areas are known in the art, Reference is now made to FIG. 1A which is a schematic illustration of a known alarm system 100. System 100 includes a sensor 101, a remote unit 102 and a central unit 104. The remote unit 102 is connected to the monitoring center 104 via a telephone network 106 and to sensor 101 via a local wired or wireless is communication connection 108.

Remote unit 102 includes an interface 114 for connecting to local devices such as sensors a communication interface 110 for connecting to the telephone network 106 and a processor (CPU) 112 for controlling the unit 102. CPU 112 is connected to interface 114 and to communication interface 110.

The central unit 104 is a monitoring and maintenance center. Monitoring and maintenance center 104 includes a communication interface 116 for connecting to the telephone network 106, a processor (CPU) 118 and a human interface 120. CPU 118 is connected to interface 116 and human interface 120.

The communication over telephone network 106 is bi-directional, hence the remote unit can call the monitoring center in case of an alarm event and the monitoring center can call the remote unit for various procedures, such as routine diagnostic procedures, random check-ups, down load and up load of various parameters, and the like.

Reference is also made now to FIG. 1B which is a schematic illustration of a prior art method, referenced 150, for operating system 100. Method 150 is a conventional diagnostic communication procedure which includes the following steps:

In step 152, the monitoring center 104 dials the telephone number of the remote unit.

In step 154, the monitoring center waits a predetermined number of rings.

In step 156, the monitoring center disconnects the call.

In step 158, the remote unit 102, having detected the rings, dials the telephone number of the monitoring center 104.

In step 160, the monitoring center picks-up the call.

In step 162, the monitoring center 104 and the remote unit 102 exchange data over the network.

According to a similar prior art method, the remote unit, after a predetermined number of rings, answers the call. Then, the monitoring center transmits an encoded identifying signal, the remote unit decodes the signal and compares it with a pre-stored string. It will be appreciated that this poses a disadvantage since an unauthorized party can transmit the identifying signal.

There are several other disadvantages to such methods. When the remote alarm unit is connected to a telephone line to which there is also connected a conventional telephone device, the system has to wait a large predetermined number of rings, usually eight or more, before answering the call, which takes a considerable period of time. The system awaits for a person to pick up the conventional telephone and take the call. If the call has not been answered after a considerable number of rings, then the system will answer the call.

It will be appreciated that, during this waiting period of time, some of the resources of the monitoring center 104 are dedicated to this procedure, and are not available for other purposes. In systems wherein the monitoring center has to control a large number of remote units, a routine diagnostic procedure to several hundreds of remote units may take hours.

This disadvantage is enhanced when the alarm system has to share the telephone line with a conventional telephony device such as an answering machine, a facsimile, a network computer and the like, since each of these telephony devices is programmed to answer an incoming call after a predetermined number of rings.

Another disadvantage is that the remote unit may detect a call from a third party, mistakenly consider it as a call from the monitoring center, and initiate an undesired call to the monitoring center.

Furthermore, when the remote unit is disarmed and there are authorized persons in the protected area, one of these persons may consider the rings provided by the call from the monitoring center 104, as an incoming call and pick up the phone.

SUMMARY OF THE PRESENT INVENTION

It is an object of the present invention to provide an alarm remote unit which overcomes the disadvantages of the prior art.

It is a further object of the present invention to provide a novel method for reducing the time period needed to establish communication in a remote alarm system.

There is thus provided in accordance with the invention a method for mutual recognition between a first alarm unit and a second unit connected therebetween by a public switching unit wherein the first alarm unit is connected to to the public switching unit via at least one first communication line and the second unit is connected to the public switching unit via at least one second communication line. The method includes the steps of:

detecting a ring signal at the first alarm unit;

detecting a caller identification (ID) signal provided by the public switching unit;

determining a caller ID number from the caller ID signal;

matching the caller ID number with at least one predetermined number; and when the caller ID number is matched to one of the at least one predetermined number associated with the second unit, executing a predetermined procedure associated with the matched at least one predetermined number.

According to another aspect of the invention, the method may include the steps of:

determining a communication line receiving the ring signal from the at least one first communication lines; and executing a predetermined procedure associated with a combination of the communication line and the number when the caller ID number is identical to the predetermined number.

The method according to the invention may also include the steps of:

transmitting an RF signal from the first alarm unit to the second unit;

detecting the RF signal at the second unit; and initiating a telephone call from the second unit to the first alarm unit.

According to yet another aspect of the invention there is provided a device for connecting between a remote alarm unit and a telephone line. The device includes a communication interface, a caller ID unit connected to the communication interface and a controller connected to the caller ID unit and the communication interface.

The caller ID unit is used for detecting caller ID signals provided from the telephone line via the communication interface, for determining a caller ID number from the caller ID signal and for providing the caller ID number to the controller.

The controller is used for matching the caller ID number with at least one predetermined number and for providing connecting command to the communication interface for connecting the remote alarm unit and the telephone line.

According to yet another aspect of the present invention there is provided an alarm unit which includes a communication interface connected to at least one telephone line, a caller ID unit connected to the communication interface, a processor connected to the caller ID unit and the communication interface and an input/output (I/O) interface.

The caller ID unit is used for detecting a caller ID signal provided from the telephone line via the communication interface, for determining a caller ID number from the caller ID signal and for providing the caller ID number to the processor.

The processor is used for matching the caller ID number with at least one predetermined number and for executing a predetermined procedure associated with the matched at least one predetermined number.

The alarm unit may further include a plurality of sensors connected to the I/O interface or a human interface connected to the I/O interface.

The alarm unit according to the invention may also include an RF transmitter connected to the I/O interface, for transmitting an RF signal and/or an RF receiver connected to the I/O interface, for receiving an RF signal.

The human interface is selected from the group consisting of:

a display, a keyboard, a voice interface, a pointing device and a printer.

BRIEF DESCRIPTION OF THE DRAWINGS

The present invention will be understood and appreciated more fully from the following detailed description taken in conjunction with the drawings in which.

DETAILED DESCRIPTION OF PREFERRED EMBODIMENTS

Figure 1A:
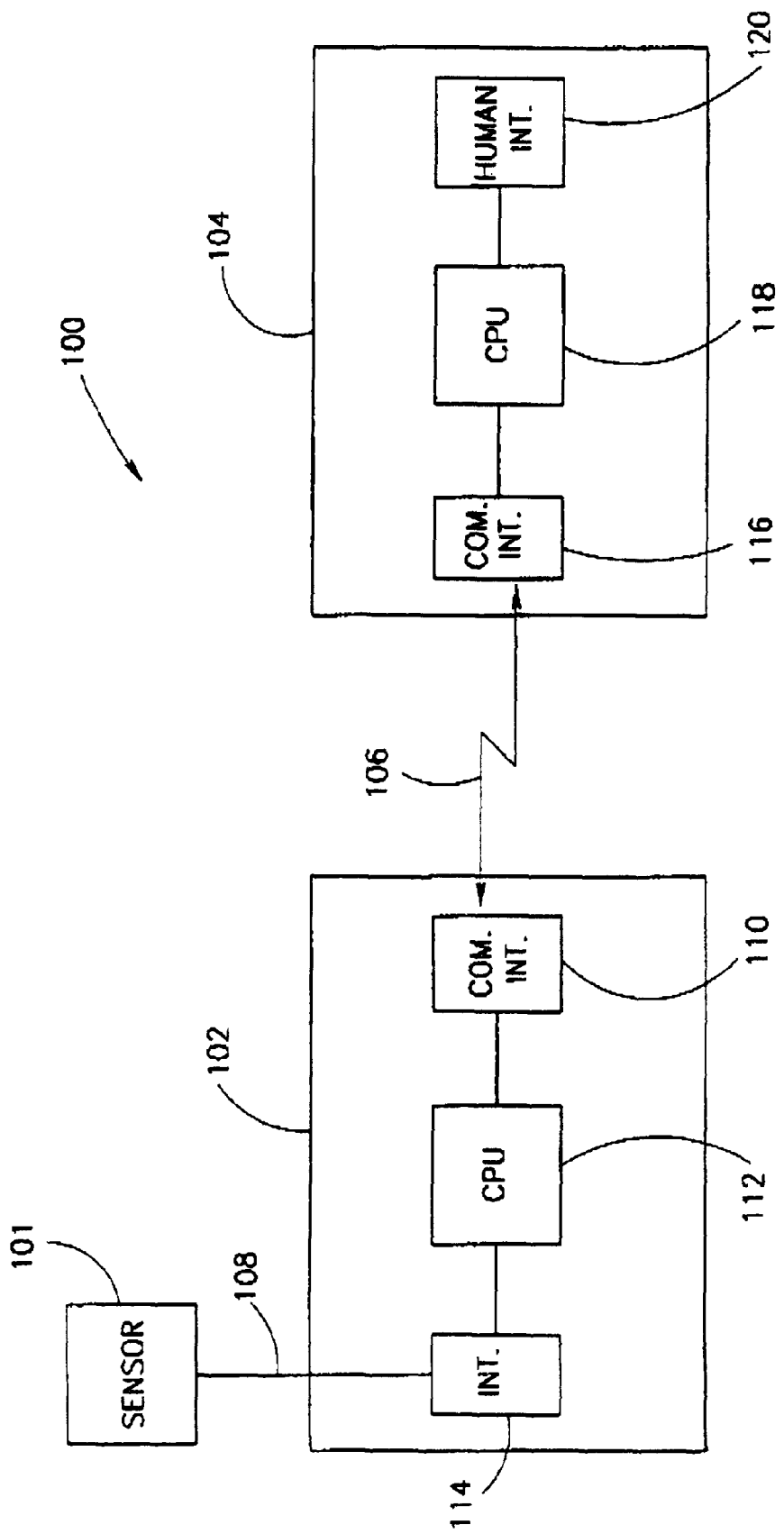
FIG. 1A is a schematic illustration of a prior art remote alarm system.
Figure 1B:
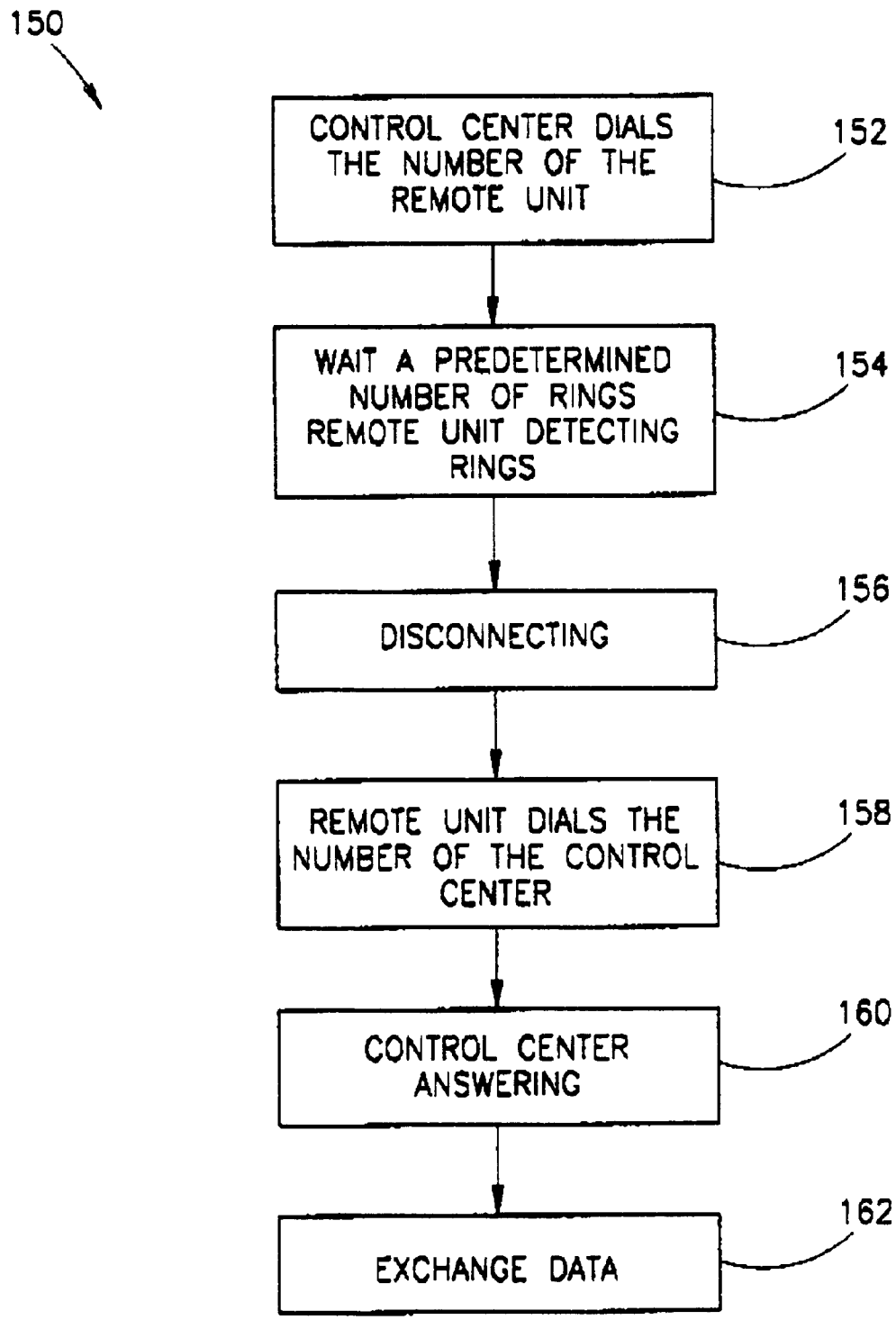
FIG. 1B is a schematic flow chart illustration of a prior art method, for operating a remote alarm system.
Figure 2:
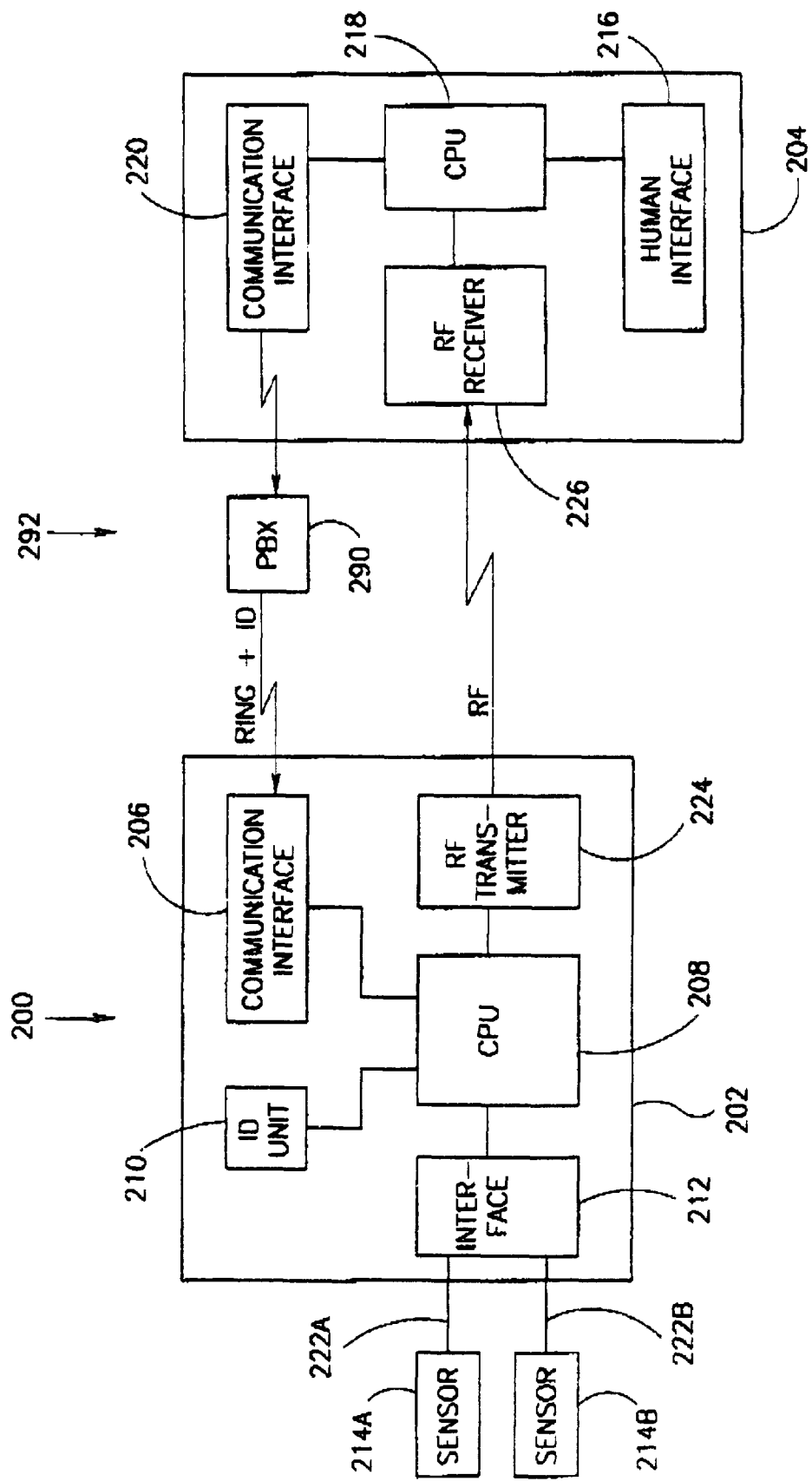
FIG. 2 is a schematic illustration of a remote alarm system, constructed and operative in accordance with a preferred embodiment of the invention.

Reference is now made to FIG. 2 which is a schematic illustration of a remote alarm system, generally designated 200, constructed and operative in accordance with a preferred embodiment of the invention. System 200 includes a monitoring center 204, a remote unit 202 and a plurality of sensors generally referenced 214. The remote unit 202 is connected to the monitoring center 204 via a telephone network 292 which includes a public switching system (PBX) 290. The remote unit 202 is also connected to sensors 214 via a local wired or wireless communication connections 222A and 222B.

Remote unit 202 includes a local interface 212 for connecting to local devices such as sensors 214A and 214B, a processor (CPU) 208 for controlling the unit 202, a communication interface 206 for connecting to communication network 292, an RF transmitter 224 and a caller identification unit 210. Processor 208 is connected to interface 212, communication interface 206, RF transmitter 224 and to caller identification unit 210.

Monitoring center 204 includes a communication interface 220, a processor 218, an RF receiver 226 and an output device 216. Processor 218 is connected to communication interface 220, RF receiver 226 and an output device 216. It will be appreciated that output device 216 may include a human interface such as a display, a keyboard, a voice interface, a pointing device, a printer and the like.

Communication Interfaces 206 and 220 can be any type of telephony interface device. In the present example, communication interfaces 206 and 220 are conventional modems or modem emulators.

Most telephone companies provide a caller identification service in which, after the first ring is transmitted to the called node, the PBX 290 transmits a signal which includes, among other data, the number of the calling node. This signal is also called a caller ID.

The present invention overcomes the disadvantages of the prior art by utilizing this caller ID signal to identify that the incoming call detected by a remote unit is actually coming from a predetermined telephone line such as a line connected to an alarm maintenance center or an alarm monitoring center.

Figure 3:
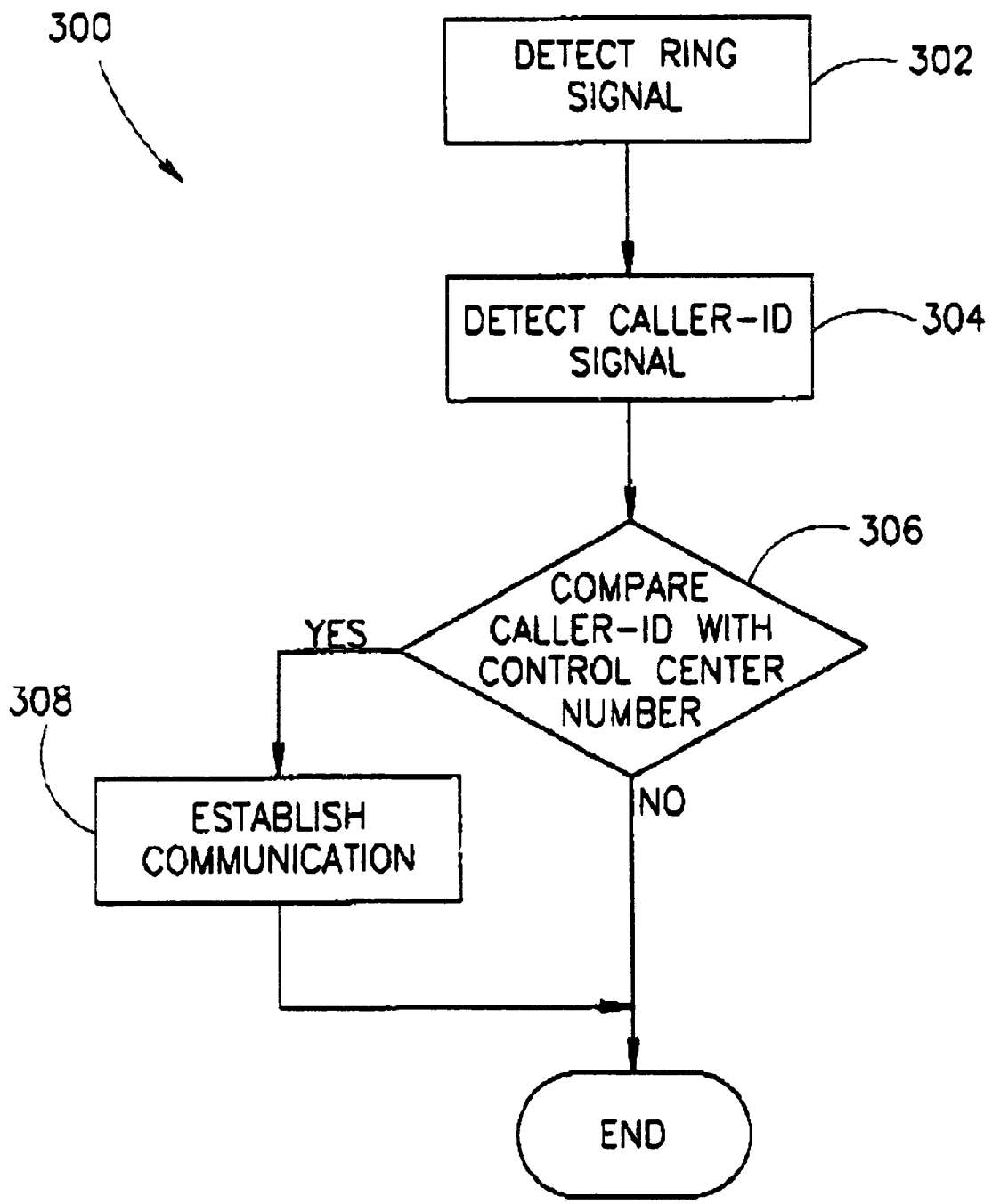
FIG. 3 is a schematic flow chart illustration of a method for operating the remote alarm system of FIG. 2, operative in accordance with a preferred embodiment of the invention.

Reference is now made to FIG. 3 which is a flow chart illustration of a method for operating remote unit 202, generally designated 300, operative in accordance with a preferred embodiment of the invention. Method 300 includes the following steps:

In step 302, communication interface 206 of the remote unit 202 detects an incoming call ring from the telephone network 292.

In step 304, caller identification unit 210 detects the caller ID signal provided by the PBX and provides it to processor 208.

In step 306, the processor 208 compares the caller ID with a predetermined number, which is a telephone number of the monitoring center. If the caller ID is identical to the predetermined monitoring center number, the remote unit 202 proceeds to step 308. Otherwise, the remote unit does not respond or take any action with regard to this call.

In step 308, the remote unit 202 establishes communication with the monitoring center 204, in which they exchange data.

According to the present invention, the remote unit 202 establishes communication with the monitoring center shortly after the first ring, before a second ring is provided. It will be appreciated that the time period needed to establish communication in the present invention is shorter than according to prior art methods.

Step 308 can be implemented in two major modes of operation. According to one mode of operation, the remote unit 202 answers the call from the monitoring center 204. According to a second mode of operation, after a short period of time, which Is less than it would take the PBX to transmit a second ring, the monitoring center disconnects the call. Then, the remote unit 202, after detecting the caller ID signal, calls the monitoring center 204 and establishes communication therewith.

The present invention can be implemented on other aspects of dialog between a monitoring center and a remote unit.

Figure 4:
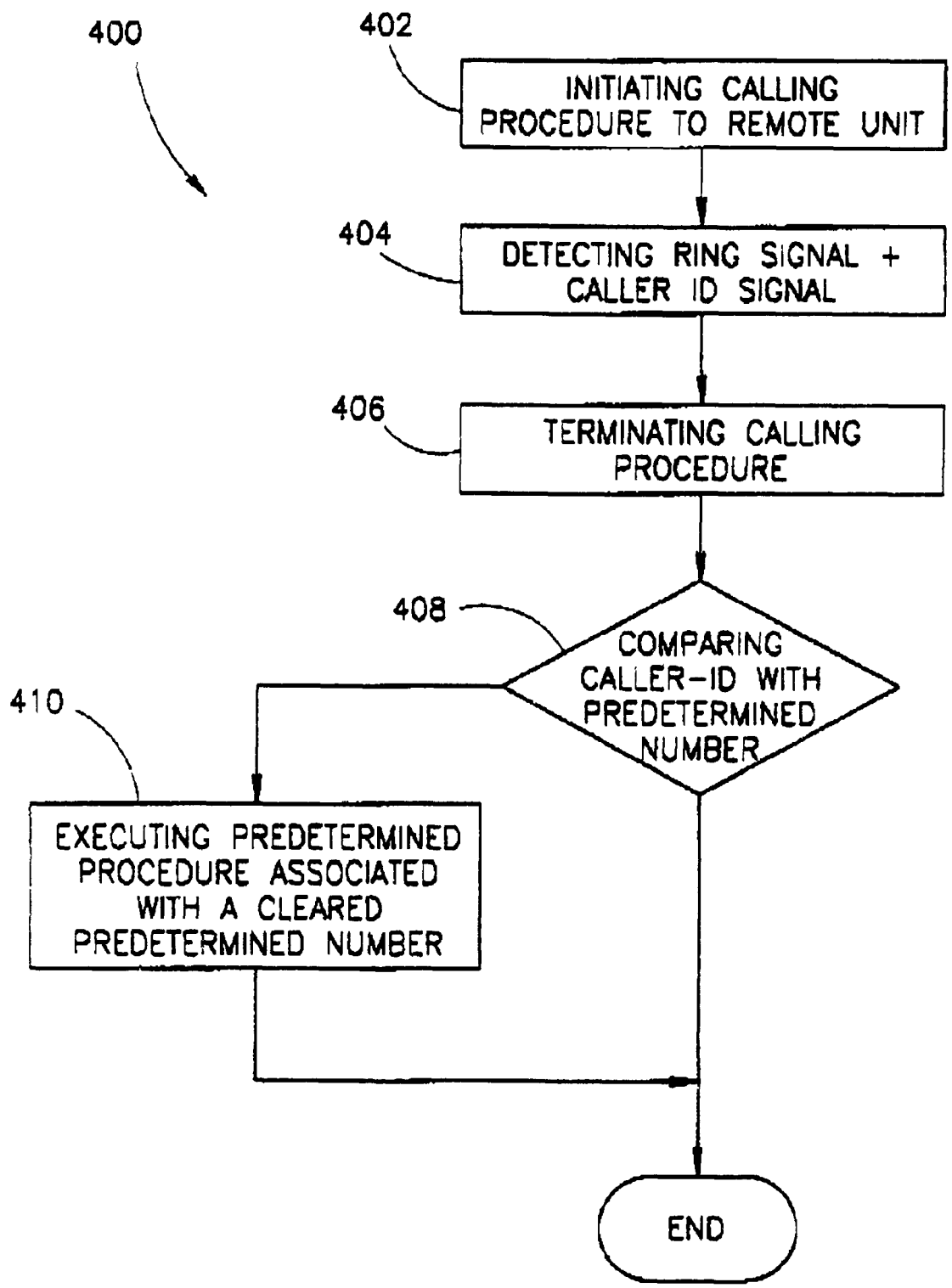
FIG. 4 is a schematic flow chart diagram illustrating a method for operating the system of FIG. 2, operative in accordance with another preferred embodiment of the invention.

Reference is now made to FIG. 4 which is a schematic flow chart illustration of another method for operating system 200, generally designated 400, operative in accordance with a preferred embodiment of the invention. Method 400 includes the following steps.

In step 402, a calling procedure to the remote unit is initiated by dialing the telephone number of the line connected to the remote unit.

In step 404, the remote unit 202 detects the ring signal and the caller ID signal which follows.

In step 406, the calling procedure is terminated before establishing communication.

In step 408, the processor 208 of the remote unit 202 compares the detected caller ID number with a plurality of predetermined numbers stored therein. If the caller ID number is identical to one of these numbers, the processor 208 proceeds to step 410. Otherwise, no action is taken.

In step 410, the processor 208 executes a predetermined procedure associated with the detected caller ID number.

According to the present example, the processor 208 stores three procedures, each associated with a different predetermined number.

A first procedure, associated with a first number N, includes a command to turn the remote unit on, i.e. switch to guard mode.

A second procedure, associated with a second number M, includes a command to turn the remote unit off, i.e. switch to sleep mode.

A third procedure, associated with a third number O, includes a command to establish communication with the calling party.

A monitoring center 204 which controls a plurality of remote units 202 can provide each of them with a command to turn either on or off, only by dialing the numbers of the telephone lines of these remote units from a predetermined telephone line bearing the number N.

Since neither the monitoring center, nor any of the remote units, have to establish full communication therebetween in order to execute the command associated with the number N, there is no charge from the telephone company for telephone calls, which makes the method according to the invention extremely cost effective.

According to another mode of operation, the remote unit 202 transmits an RF signal via transmitter 224 which is detected at the monitoring center 204 by RF receiver 226. When detecting this RF signal, the monitoring center 204 initiates a dialing procedure to remote unit 202. The remote unit 202 detects the first ring and the caller ID that follows. This mode of operation provides rapid authentication procedure between the remote unit and the monitoring center, acknowledging the received RF signal and preventing re-transmitting or backup attempts.

It will be appreciated that the monitoring center identifying signal is provided by the telephone company and not by the monitoring center 204 which practically eliminates the hazard of forgery of the identification of the calling party, which exists in conventional alarm systems. Only calls which come directly from the telephone line of the monitoring center are answered by the remote unit.

Figure 5:
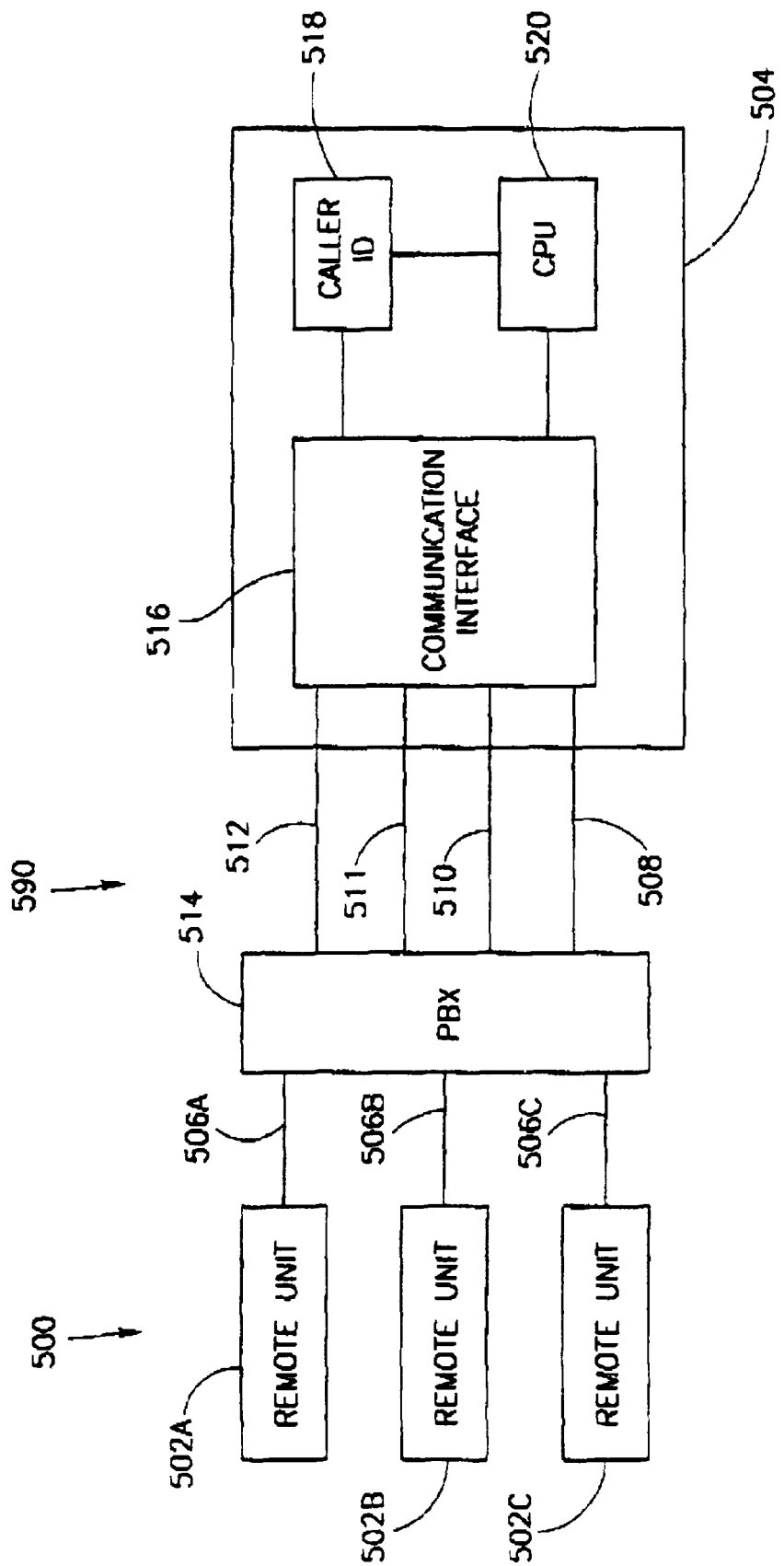
FIG. 5 is a schematic illustration of a remote alarm system, constructed and operative in accordance with a further preferred embodiment of the invention.

The basic concept of the invention is extendible in both directions. Reference is now made to FIG. 5 which is a schematic illustration of a remote alarm system, generally designated 500, constructed and operative in accordance with a further preferred embodiment of the invention. System 500 includes a monitoring center 504 and a plurality of remote units, generally referenced 502. The remote units 502 are connected to the monitoring center 504 via a telephone network 590 which includes a public switching system (PBX) 514 and a plurality of telephone lines 506A, 506B, 506C, 508, 510, 511 and 512.

The monitoring center 504 includes a communication interface 516, a processor 520 and a caller identification unit 518. Remote units 502A, 502B and 502C are generally similar to remote unit 202 shown in conjunction with FIG. 2.

When a remote unit, for example remote unit 502B, initiates a call to monitoring center 504, the PBX 514 transmits a caller ID signal to the monitoring center 504. The caller identification unit 518 of the monitoring center 504 detects this signal and provides it to the processor 520 for further processing.

According to the present invention, the remote unit can call the monitoring center using four different telephone numbers, each assigned to a different telephone line 512, 511, 510 and 508. The processor 520 can associate the caller ID signal with a specific telephone line from which the call was received to determine a predetermined condition.

In the present example, remote unit 502B notifies the monitoring center 504 of an alarm situation simply by dialing the number of telephone line 511. The monitoring center, detecting the caller ID signal of the telephone line 506B received from telephone line 511, determines that there is an alarm situation in progress at the area guarded by remote unit 502B and takes action accordingly.

It will be appreciated that each of the telephone lines 512, 511, 510 and 508 is a logical telephone line which is associated with a predetermined telephone number.

Figure 6:
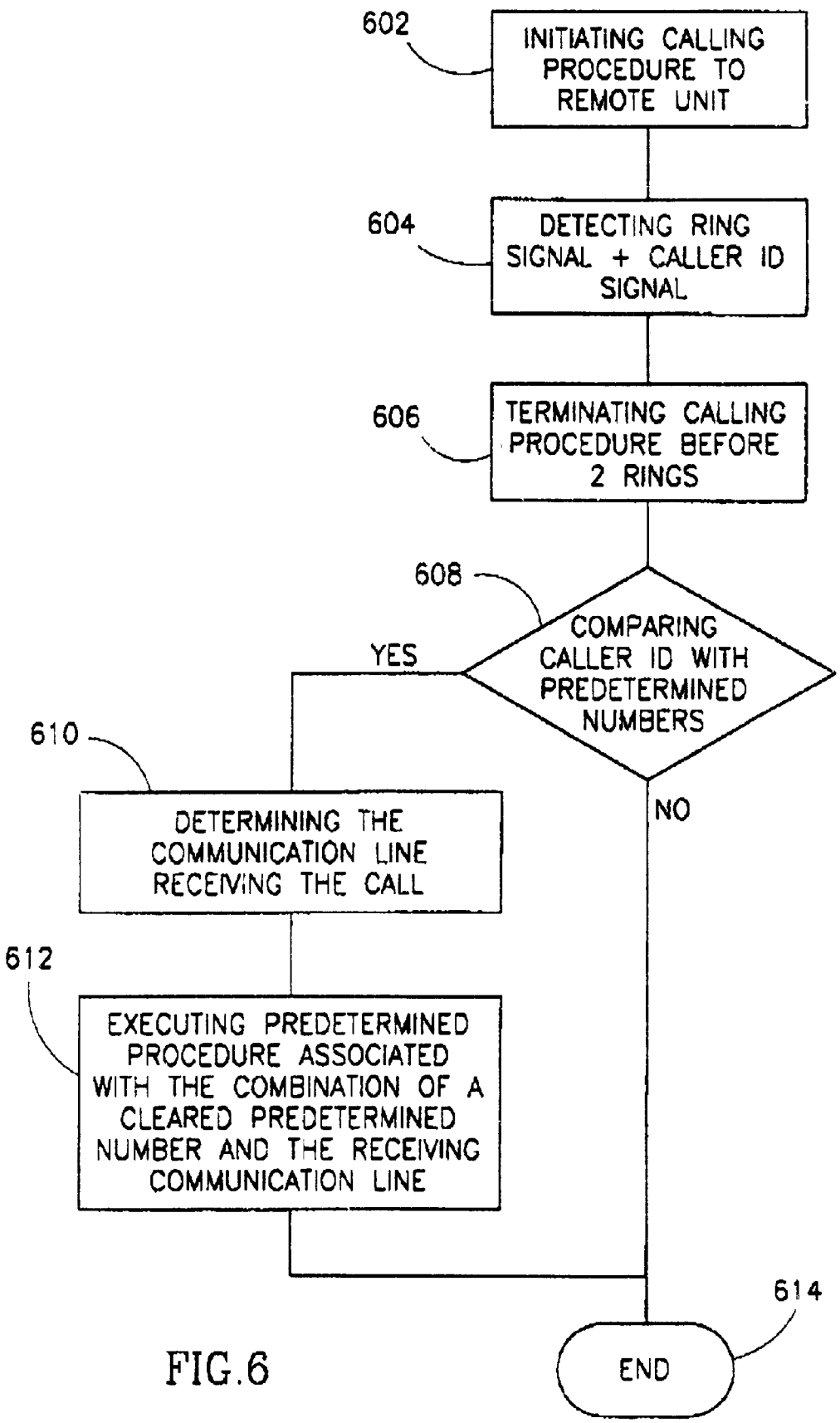
FIG. 6 is a schematic flow chart diagram illustrating yet another method for operating the remote alarm system of FIG. 5, operative in accordance with a preferred embodiment of the invention.

Reference is now made to FIG. 6 which is a schematic flow chart diagram illustration of yet another method for operating system 500, operative in accordance with a preferred embodiment of the invention. The method of the invention includes the following steps:

In step 602, a calling procedure to a predetermined line 508, 510, 511 or 512, connected to the main unit is initiated by dialing the telephone number of the predetermined line connected to the main unit 504.

In step 604, the main unit 504 detects the ring signal and the caller ID signal which follows.

In step 606, the calling procedure is terminated before establishing communication.

In step 608, the processor 520 of the main unit 504 compares the detected caller ID number with a plurality of predetermined numbers stored therein. If the caller ID number is identical to one of these numbers, the processor 520 proceeds to step 610. Otherwise, no action is taken and the process is terminated (614).

In step 610, the processor 520 determines the line receiving the call.

In step 612, the processor 520 executes a predetermined procedure associated with combination of the detected caller ID number and the receiving communication line.

Figure 7:
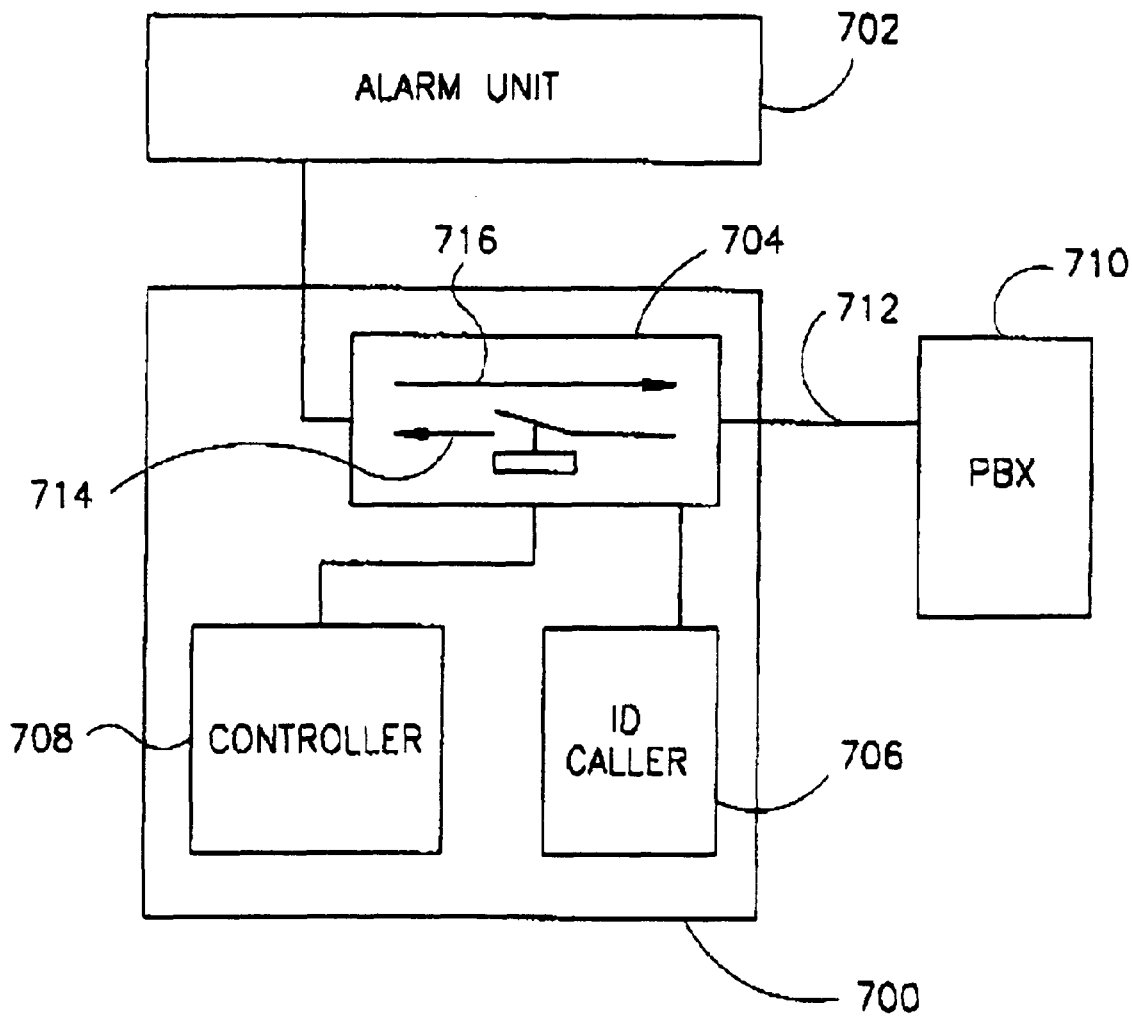
FIG. 7 is a schematic illustration of a remote alarm unit and an add-on device, constructed and operative in accordance with yet a further preferred embodiment of the invention.

Reference is now made to FIG. 7 which is a schematic illustration of a remote alarm unit 702 and an add-on device, generally referenced 700, constructed and operative In accordance with yet a further preferred embodiment of the invention. Device 700 connects between remote alarm unit 702 and PBX 710.

Device 700 includes a communication interface 704, a controller 708 and a caller ID unit 706. Communication Interface 704 and caller ID unit 706 are connected to controller 708. Communication interface 704 is adapted to limit incoming calls from remote alarm unit 702, shown by line 714 and to enable calls outgoing from unit 702.

When telephone line 712 provides a call to device 700, caller ID unit 706 detects the caller ID number transmitted therewith and provides it to controller 708. The controller 708 compares this number with pre-stored numbers. If this number is equal to one of the pre-stored numbers, the controller 708 provides a connecting command to interface 704 for connecting remote alarm unit 702 to communication line 712.

It will be appreciated by persons skilled in the art that the present invention is not limited to what has been particularly shown and described hereinabove. Rather the scope of the present invention is defined only by the claims which follow.

We claim:

1. A method for mutual recognition between a first alarm unit and a second unit connected therebetween by a public switching unit, wherein the first alarm unit is connected to the public switching unit via at least one first communication line and the second unit is connected to said public switching unit via at least one second communication line, the method comprising the steps of:

initiating a telephone call from said second unit to said first alarm unit;

detecting a ring signal at said first alarm unit;

detecting a caller identification (ID) signal provided by said public switching unit;

determining a caller ID number from said caller ID signal;

matching said caller ID number with at least one predetermined number; and transmitting an RF signal from said first alarm unit to said second unit;

detecting said RF signal at said second unit, when said caller ID number is matched to one of said at least one predetermined number associated with said second unit, executing a predetermined procedure associated with the matched at least one predetermined number.

2. A method according to claim 1 further comprising the steps of:

determining a communication line receiving said ring signal from said at least one first communication lines; and executing a predetermined procedure associated with a combination of said communication line and the matched number when said caller ID number is identical to said predetermined number.

3. An alarm unit comprising:

a communication interface connected to at least one telephone line;

a caller ID unit connected to said communication interface;

a processor connected to said caller ID unit and said communication interface;

an input/output (I/O) interface; and a plurality of sensors connected to said I/O interface;

said caller ID unit for detecting a caller ID signal provided from said telephone line via said communication interface, for determining a caller ID number from said caller ID signal and for providing said caller ID number to said processor, said processor for matching said caller ID number with at least one predetermined number and for executing a predetermined procedure associated with the matched at least one predetermined number.

4. An alarm unit comprising:

a communication interface connected to at least one telephone line; a caller ID unit connected to said communication interface;

a processor connected to said caller ID unit and said communication interface;

an input/output (I/O) interface; and an RF transmitter connected to said I/O interface, for transmitting an RF signal, said caller ID unit for detecting a caller ID signal provided from said telephone line via said communication interface, for determining a caller ID number from said caller ID signal and for providing said caller ID number to said processor, said processor for matching said caller ID number with at least one predetermined number and for executing a predetermined procedure associated with the matched at least one predetermined number.

5. An alarm unit comprising:

a communication interface connected to at least one telephone line;

a caller ID unit connected to said communication interface;

a processor connected to said caller ID unit and said communication interface;

an input/output (I/O) interface; and an RF receiver connected to said I/O interface, for receiving an RF signal, said caller ID unit for detecting a caller ID signal provided from said telephone line via said communication interface, for determining a caller ID number from said caller ID signal and for providing said caller ID number to said processor, said processor for matching said caller ID number with at least one predetermined number and for executing a predetermined procedure associated with the matched at least one predetermined number.

* * * * *